US012620061B2

(12) United States Patent
Jee

(10) Patent No.: US 12,620,061 B2
(45) Date of Patent: May 5, 2026

(54) METHOD AND APPARATUS WITH IMAGE PROCESSING

(71) Applicant: SAMSUNG ELECTRONICS CO., LTD., Suwon-si (KR)

(72) Inventor: Seunghoon Jee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 350 days.

(21) Appl. No.: 18/319,872

(22) Filed: May 18, 2023

(65) Prior Publication Data

US 2024/0161244 A1     May 16, 2024

(30) Foreign Application Priority Data

Nov. 15, 2022     (KR) ......................... 10-2022-0152573

(51) Int. Cl.
 *G06T 5/50*       (2006.01)
 *G06T 5/70*       (2024.01)
       (Continued)

(52) U.S. Cl.
 CPC .................. *G06T 5/50* (2013.01); *G06T 5/70* (2024.01); *G06T 7/20* (2013.01); *G06T 9/002* (2013.01);
       (Continued)

(58) Field of Classification Search
 CPC ......... G06T 7/207; G06T 7/246; G06T 7/579; G06T 5/50; G06T 5/70; G06T 7/20; G06T 9/002; G06T 2207/10016; G06T 2207/20081; G06T 2207/20084; G06T 2207/20221; G06T 5/60; G06T 3/147; G06T 7/223; G06T 2207/20008; G06T 3/14; G06T 7/11; G06T 7/70; G06T 9/00; G06T 3/4046; G06T 2207/20076;
(Continued)

(56) References Cited

U.S. PATENT DOCUMENTS 11,303,923 B2     4/2022  Boyce et al.
11,887,275 B1 *   1/2024  Baker, III .............. G06V 20/56
(Continued)

FOREIGN PATENT DOCUMENTS

KR     10-2021-0153129 A    12/2021

OTHER PUBLICATIONS

Li, Haipeng, et al. "DeepOIS: Gyroscope-Guided Deep Optical Image Stabilizer Compensation." IEEE Transactions on Circuits and Systems for Video Technology 32.5, arXiv:2101.11183vl [cs. CV] Jan. 27, 2021, (10 pages).
(Continued)

*Primary Examiner* — Jose L Couso
(74) *Attorney, Agent, or Firm* — Sughrue Mion, PLLC

(57)     ABSTRACT

A processor-implemented method includes estimating a transformation model using a transformation determination neural network model, provided motion sensor detected motion data representing motion of an image sensor with respect to a first image frame and a subsequent second image frame from captured by the image sensor, to perform a transformation based on global motion between the first image frame and the second image frame, and generating output image data by combining, by using the transformation model, the first image frame and the second image frame.

18 Claims, 10 Drawing Sheets

(51) Int. Cl.
G06T 7/20 (2017.01)
G06T 9/00 (2006.01)

(52) U.S. Cl.
CPC ............... *G06T 2207/10016* (2013.01); *G06T 2207/20081* (2013.01); *G06T 2207/20084* (2013.01); *G06T 2207/20221* (2013.01)

(58) Field of Classification Search
CPC .... H04N 19/52; H04N 19/176; H04N 19/527; H04N 19/54; H04N 19/58; H04N 19/96; H04N 19/105; H04N 19/184; H04N 19/543; H04N 19/573; H04N 19/593; H04N 19/597; H04N 23/6812; H04N 23/682; H04N 23/68; H04N 5/145; G06N 3/04; G06N 3/02; G06N 3/08–088; G06N 3/0445; G06N 3/0454; G06N 3/0464; G06N 3/4046; G06N 3/4053; G06N 7/00; G06N 7/01; G06N 20/00; G06K 7/1482; G06V 10/454; G06V 10/54; G06V 10/764; G06V 10/774; G06V 10/82; G06V 10/84; G06V 20/41; G06V 30/18057; G06V 20/698; G06V 30/19173; G06F 18/214; G06F 18/22; G06F 18/241; G06F 18/24; G06F 18/2411; G06F 18/2415; G06F 30/27; Y10S 128/925
See application file for complete search history.

(56) References Cited

U.S. PATENT DOCUMENTS

| | | | | |
|---|---|---|---|---|
| 12,394,100 | B2 * | 8/2025 | Le | H04N 19/17 |
| 2008/0285806 | A1 * | 11/2008 | Kokaram | H04N 19/553 382/107 |
| 2018/0103206 | A1 | 4/2018 | Olson | |
| 2018/0359483 | A1 * | 12/2018 | Chen | H04N 19/70 |
| 2019/0114804 | A1 * | 4/2019 | Sundaresan | G06T 7/74 |
| 2020/0265590 | A1 * | 8/2020 | Daniilidis | G06T 7/269 |
| 2020/0396480 | A1 | 12/2020 | Furht et al. | |
| 2021/0097696 | A1 | 4/2021 | Ye et al. | |
| 2021/0110552 | A1 * | 4/2021 | Bhat | G06T 7/70 |
| 2022/0027642 | A1 * | 1/2022 | Shambik | G01C 21/26 |
| 2022/0182536 | A1 | 6/2022 | Sharma et al. | |
| 2023/0267624 | A1 * | 8/2023 | Konda | G06T 7/238 382/100 |
| 2024/0013441 | A1 * | 1/2024 | Le | G06T 3/40 |

OTHER PUBLICATIONS

Extended European search report issued on Feb. 28, 2024, in counterpart European Patent Application No. 23193287.2 (10 pages).

* cited by examiner

METHOD AND APPARATUS WITH IMAGE PROCESSING

CROSS-REFERENCE TO RELATED APPLICATIONS

This application claims the benefit under 35 USC § 119(a) of Korean Patent Application No. 10-2022-0152573, filed on Nov. 15, 2022, in the Korean Intellectual Property Office, the entire disclosure of which is incorporated herein by reference for all purposes.

BACKGROUND

1. Field

The following description relates to a method and apparatus with image processing.

2. Description of Related Art

A deep learning-based neural network may be used for image processing. The neural network may be trained based on deep learning and may perform inference for a desired purpose by mapping input data and output data that are in a nonlinear relationship to each other. Such a trained capability of generating the mapping may be referred to as a learning ability of the neural network.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method may include estimating a transformation model using a transformation determination neural network model, provided motion sensor detected motion data representing motion of an image sensor with respect to a first image frame and a subsequent second image frame from captured by the image sensor, to perform a transformation based on global motion between the first image frame and the second image frame; and generating output image data by combining, by using the transformation model, the first image frame and the second image frame.

The method may further include generating input image data comprising the first image frame and the second image frame using the image sensor; and generating the motion data using the motion sensor; performing the generating of the output image data by encoding the first image frame and the second image frame into video data corresponding to the output image data using the transformation model.

The video data may include matching data between pixel blocks of the first image frame and pixel blocks of the second image frame, and wherein the encoding may include setting a search area of the second image frame for block matching of a first pixel block of the first image frame by using the transformation model; and searching for a second pixel block matching with the first pixel block in the search area of the second image frame.

The setting of the search area may include transforming a first position of the first pixel block of the first image frame to a second position of the second image frame by using the transformation model; and setting the search area of the second image frame according to the second position.

The setting of the search area may include transforming a search area of the first image frame according to the first pixel block of the first image frame to the search area of the second image frame by using the transformation model.

The generating of the output image data may include generating photo data corresponding to the output image data by compensating the global motion between the first image frame and the second image frame by using the transformation model.

The motion data may include at least some of acceleration data and angular velocity data according to the motion of the image sensor between the first time and the second time.

In the method, a first sensing period of the motion sensor is less than a second sensing period of the image sensor, and wherein motion data generated by combining output data of the motion sensor that is collected during the second sensing period is input to the transformation determination neural network model.

The method may further include generating the transformation determination neural network model by training on in-training transformation determination neural network model using training data based on a sensing result obtained by sensing a corresponding motion of the image sensor by the motion sensor with respect to a training image captured by the image sensor of a test pattern.

The method may further include generating the neural network model by determining a first test transformation model by performing vision analysis on test image data obtained by capturing a provided test pattern through the image sensor; estimating a second test transformation model by inputting, to the neural network model, test motion data obtained by sensing the motion of the image sensor through the motion sensor while the image sensor captures the provided test pattern; determining first loss data corresponding to a difference between the first test transformation model and the second test transformation model; and generating the transformation determination neural network model by training an in-training transformation determination neural network model based on the first loss data.

The method may further include generating the neural network model by generating a first result image by transforming an additional test image by using the first test transformation model; generating a second result image by transforming the additional test image by using the second test transformation model; determining second loss data corresponding to a difference between the first result image and the second result image; and generating the transformation determination neural network model by training an in-training transformation determination neural network model based on the first loss data and the second loss data.

A non-transitory computer-readable storage medium storing instructions that, when executed by a processor, cause the processor to perform the method above.

In another general aspect, an electronic device may include one or more processors configured to estimate a transformation model using a transformation determination neural network model, provided motion sensor detected motion data representing motion of an image sensor with respect to a first image frame and a subsequent second image frame from captured by the image sensor, to perform a transformation based on global motion between the first image frame and the second image frame; and generate output image data by combining, by using the transformation model, the first image frame and the second image frame.

The electronic device may further include an image sensor configured to generate input image data comprising the first image frame and the second image frame; a motion sensor configured to generate the motion data; and wherein the one or more processors may include a codec configured to encode the first image frame and the second image frame into video data corresponding to the output image data using the transformation model.

The video data may include matching data between pixel blocks of the first image frame and pixel blocks of the second image frame, and wherein the codec is configured to set a search area of the second image frame for block matching of a first pixel block of the first image frame by using the transformation model and search for a second pixel block matching with the first pixel block of the first image frame in the search area of the second image frame.

The codec, to set the search area, may be configured to transform a first position of the first pixel block of the first image frame to a second position of the second image frame by using the transformation model and set the search area of the second image frame according to the second position.

The codec, to set the search area, may be configured to transform a search area of the first image frame according to the first pixel block of the first image frame to the search area of the second image frame by using the transformation model.

The one or more processors, to generate the output image data, may be configured to generate photo data corresponding to the output image data by compensating the global motion between the first image frame and the second image frame by using the transformation model.

In the electronic device, a first sensing period of the motion sensor is less than a second sensing period of the image sensor, and wherein motion data generated by combining output data of the motion sensor that is collected during the second sensing period is input to the transformation determination neural network model.

The transformation determination neural network model may be generated by training on in-training transformation determination neural network model using training data based on a sensing result obtained by sensing a corresponding motion of the image sensor by the motion sensor with respect to a training image captured by the image sensor of a test pattern.

Other features and aspects will be apparent from the following detailed description, the drawings, and the claims.

Figure 1:
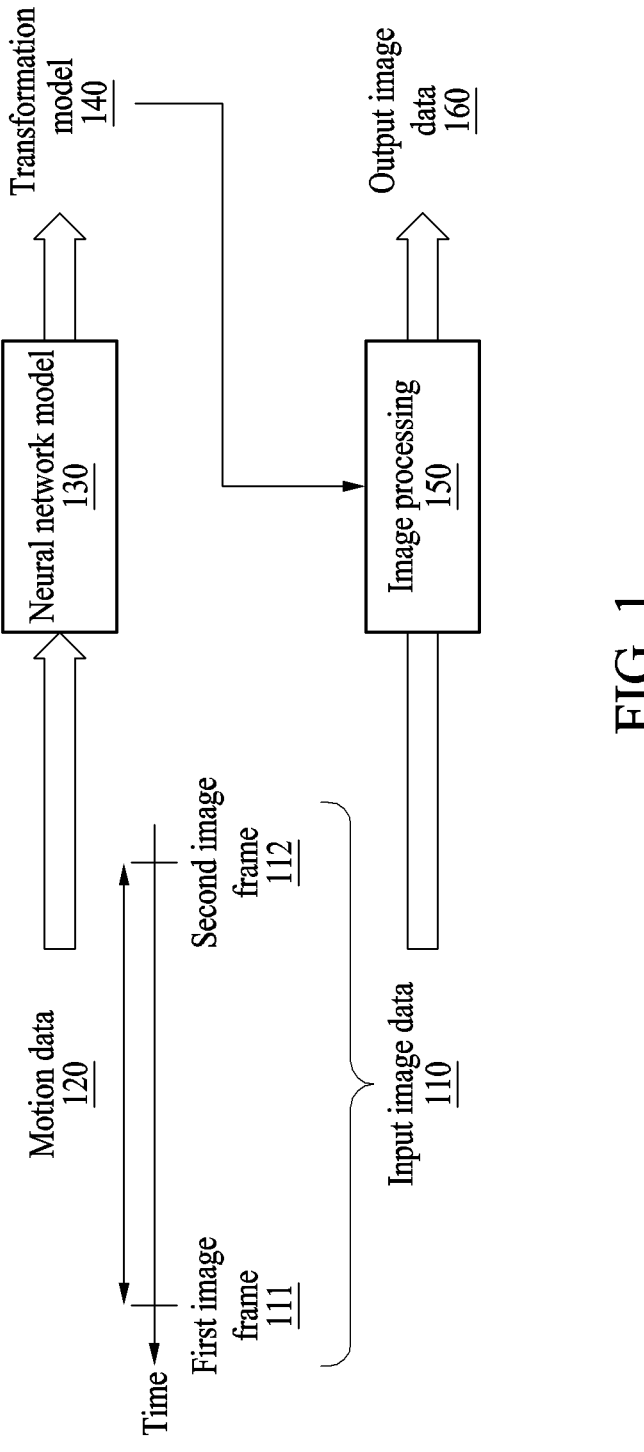
FIG. 1 illustrates an example apparatus and method with image processing using a transformation model according to one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing. It is to be understood that if a component (e.g., a first component) is referred to, with or without the term "operatively" or "communicatively," as "coupled with," "coupled to," "connected with," or "connected to" another component (e.g., a second component), it means that the component may be coupled with the other component directly (e.g., by wire), wirelessly, or via a third component.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

A neural network is a type of machine learning model, trained for a special purpose such as image restoration, may have a generalization ability to generate a relatively accurate output for an input pattern that the neural network wasn't trained for. For example, performed operations of a trained neural network may be retrained for an inference operations.

FIG. 1 illustrates an example apparatus and method with image processing using a transformation model according to one or more embodiments. The apparatus may be a processor-implemented electronic device. The electronic device may include an image sensor and a motion sensor. As a non-limiting example, the image sensor may be an ultra-fast image sensor with a built-in neural network, which can be trained to recognize and capture images of target objects for tasks. Images captured by the image sensor may be referred to as input image data. Also, the motion sensor may be an ultra-fast image sensor with a built-in neural network, which can be trained to detect a motion of the image sensor, and generate motion data with respect to the image sensor.

In an example illustrated by FIG. 1, input image data 110 generated by an image sensor may include a first image frame 111 and a second image frame 112. The first image frame 111 may be generated at a first time and the second image frame 112 may be generated at a second time. Motion data 120 generated by a motion sensor may represent the motion of the image sensor between the first time and the second time.

The image sensor and the motion sensor may be implemented in one device (e.g., an electronic device) or in separate devices having respective processors configured to implement the respective neural networks. For example, the image sensor may be implemented as a camera of the electronic device, and the motion sensor may be implemented as an inertial measurement unit (IMU) of the same electronic device. In this case, the motion of the electronic device, the motion of the image sensor, and the motion of the motion sensor may coincide with one another, and the motion data 120 of the motion sensor may represent the coincident motion. For example, the motion data 120 may include at least some of acceleration data and angular velocity data according to the coincident motion. In an example, the motion data 120 may include an acceleration value and an angular velocity value with respect to each of an x-axis, a y-axis, and a z-axis.

A neural network model 130 may estimate a transformation model 140 based on the motion data 120. The neural network model 130 may include a deep neural network (DNN) including a plurality of layers. The layers may include an input layer, at least one hidden layer, and an output layer. For convenience of explanation, examples below will be described with respect to such neural networks implemented by the image and motion sensors. However, examples are not limited to the same, as alternate machine learning model may be implemented.

As non-limiting example, the DNN may include at least one of a fully connected network (FCN), a convolutional neural network (CNN), or a recurrent neural network (RNN). For example, at least some of the plurality of layers in the neural network may correspond to the CNN and the others may correspond to the FCN. The CNN may be referred to as convolutional layers and the FCN may be referred to as fully connected layers.

In the CNN, data input to each layer may be referred to as an input feature map and data output from each layer may be referred to as an output feature map. The input feature map and the output feature map may also be referred to as activation data. When a convolutional layer corresponds to an input layer, an input feature map of the input layer may be an image or patch of the same.

The neural network may be trained based on deep learning to perform inference suitable for a trained purpose. The deep learning may be a machine learning technique to train a neural network to perform such tasks as image or speech recognition. As a non-limiting example, the deep learning may be understood as a process of solving an optimization issue toward finding a point at which energy may be minimized (or minimized to an acceptable threshold) while iteratively training the neural network using prepared training data, for example.

Through such supervised learning or unsupervised learning of deep learning, a weight corresponding to an architecture or model of the neural network may be obtained. Through the weight, the input data and the output data may be mapped to each other. For example, when the width and depth of the neural network are sufficiently large, the neural network may have a capacity large enough to implement an arbitrary function. When the neural network is trained on a sufficiently large quantity of training data through an appropriate training process, optimal performance may be achieved.

The neural network may be expressed as being trained in advance, in which "in advance" means "before" the neural network can be used for inference operation, e.g., for input real world or non-training data with desired accuracies, for example. As a non-limiting example, implementation of the neural network may include the loading the parameters (e.g., weightings) of the neural network from a memory, and an input provision of input data to the neural network after the neural network has been loaded from the memory.

The transformation model 140 may perform transformation based on global motion between the first image frame 111 and the second image frame 112. In an example, the transformation model 140 may be a 2-dimensional (2D) transformation model. In an example, the transformation model 140 may be an affine transformation model according to Equation 1.

$$\begin{bmatrix} x' \\ y' \\ 1 \end{bmatrix} = \begin{bmatrix} a & b & e \\ c & d & f \\ 0 & 0 & 1 \end{bmatrix} \begin{bmatrix} x \\ y \\ 1 \end{bmatrix} \qquad \text{Equation 1}$$

In Equation 1, x and y denote transformation targets, a, b, c, d, e, and f denote transformation parameters, and x' and y' denote transformation results. A transformation result may be derived from a transformation target through a transformation parameter. The transformation result may be derived by performing translation, rotation, zooming, skewing, and the like on the transformation target through the transformation parameter. Zooming may be scaling.

An integral calculation, noise reduction, or the like may be used to derive the transformation model 140 from the motion data 120, such as acceleration and angular velocity. Vision analysis using the input image data 110 may include estimation of a matching point, identification of an outlier based on local motion, a solution for a throughput of random sample consensus (RANSAC), or the like. The neural network model 130, based on appropriate training, may rather readily and accurately estimate the transformation model 140 from the motion data 120.

The transformation model 140 may be used for various applications for image processing 150 of the input image data 110. In an example, the transformation model 140 may be configured to estimate the global motion between the first image frame 111 and the second image frame 112. The transformation model 140 may be further configured to perform block matching between the first image frame 111 and the second image frame 112 based on the estimated global motion. The transformation model 140 may increase the accuracy of motion estimation and block matching. The motion estimation and/or the block matching may be used for a video codec and/or image signal processing (ISP), and thus the transformation model 140 may increase the performance and/or efficiency of the video codec and/or the ISP.

Figure 2:
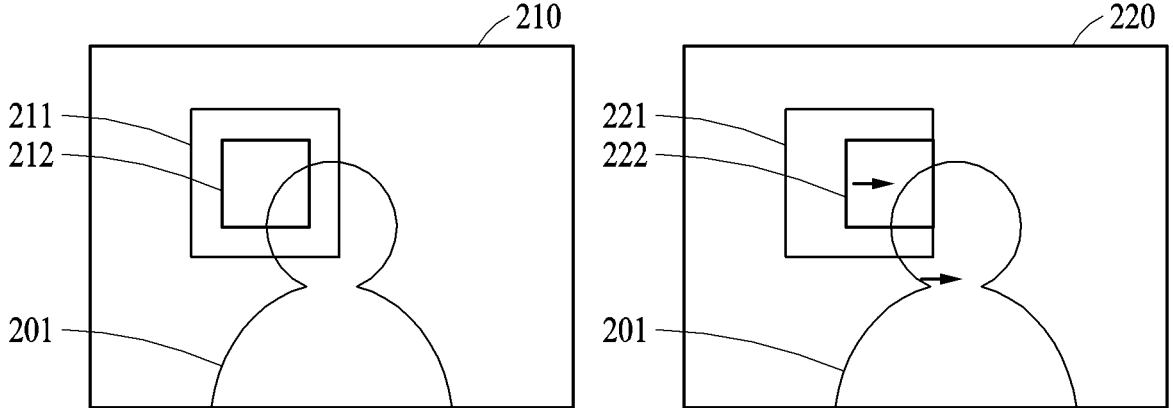
FIGS. 2 and 3 illustrate examples of a block-matching process using a search area, according to one or more embodiments.
Figure 3:
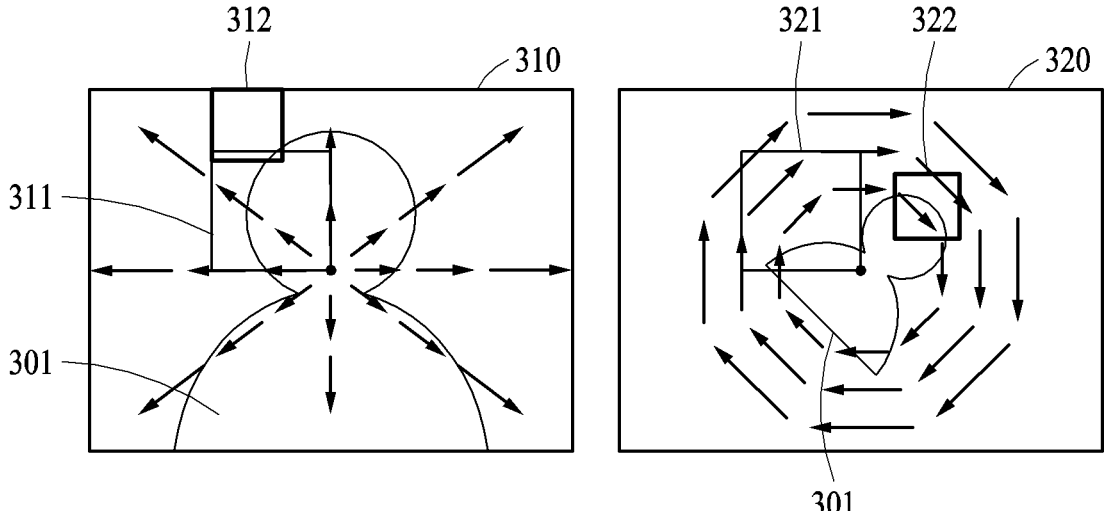

FIGS. 2 and 3 illustrate examples of a block-matching process using a search area according to one or more embodiments. Referring to FIG. 2, an image sensor, such as the image sensor described with respect to FIG. 1, may generate a first image frame 210 at a first time and a second image frame 220 at a second time. The second time may be prior to the first time. The first image frame 210 may be a current image frame and the second image frame 220 may be a reference image frame. The current image frame 210 and the reference image frame 220 may each be divided into a plurality of pixel blocks. Each pixel block may include a plurality of pixels. The size of each pixel block may be the same. The size of each pixel block may correspond to the number of pixels included by each pixel block. Each pixel block of the reference image frame 220 corresponding to each pixel block of the current image frame 210 may be sensed through block matching.

To perform the block matching, a search area for each pixel block of the current image frame 210 may be set in the reference image frame 220. The size of a search area may be greater than the size of a pixel block. For example, to perform block matching for a first current pixel block 212 of the first image frame 210, a reference search area 221 may be set in the second image frame 220 based on a current search area 211 of the first image frame 210. The current search area 211 may include the first current pixel block 212 in the center of the current search area 211. In one example, the size and position of the current search area 211 with respect to the first image frame 210 may be the same as the size and position of the reference search area 221 with respect to the second image frame 220.

When the reference search area 221 is set, block matching may be performed for the first current pixel block 212 based on the set reference search area 221. Reference pixel blocks may be set through a shift of a preset width (e.g., a single pixel) in the reference search area 221, and a similarity between each reference pixel block and the first current pixel block 212 may be determined. A reference pixel block having the highest similarity may match with the first current pixel block 212. In an example, a sum of absolute difference (SAD) may be used to measure a similarity. Arrows of the second image frame 220 may indicate global motion. For example, the motion of a camera may cause the global motion. Based on the global motion, a first reference pixel block 222 may have the highest similarity to the first current pixel block 212. According to pixel matching, the first current pixel block 212 may match with the first reference pixel block 222. Pixel matching may be performed on the other current pixel blocks of the first image frame 210. When the pixel matching is completed, matching data may be generated. The matching data may match current pixel blocks of the current image frame 210 respectively with reference pixel blocks of the reference image frame 220.

Referring to FIGS. 2 and 3, a third image frame 310 and a fourth image frame 320 may be other reference image frames. Arrows of the third image frame 310 and arrows of the fourth image frame 320 may indicate global motion. The arrows of the third image frame 310 may indicate zoom-in motion of a camera. A reference search area 311 corresponding to the current search area 211 of the current image frame 210 may be set in the third image frame 310. In this case, pixel matching may need to be performed between the first current pixel block 212 and a second reference pixel block 312. However, because the second reference pixel block 312 is outside the reference search area 311, appropriate pixel matching may not be performed. The arrows of the fourth image frame 320 may indicate rotation motion of the camera. A reference search area 321 corresponding to the current search area 211 of the current image frame 210 may be set in the fourth image frame 320. In this case, pixel matching may need to be performed between the first current pixel block 212 and a third reference pixel block 322. However, because the third reference pixel block 322 is outside the reference search area 321, appropriate pixel matching may not be performed.

The position and size of a search area may greatly affect pixel matching performance because search is performed based on reference pixel blocks in the search area during pixel matching. When global motion, such as zoom motion and rotation motion, occurs, an increase of resolution may increase motion in a frame, and an appropriate reference pixel block may become outside the search area. When the size of the search area increases, the number of reference pixel blocks in the search area may increase, and a throughput for pixel matching may increase. The size of the search area may not limitlessly increase. In examples to be described below, the efficiency and performance of pixel matching may increase by appropriately adjusting the search area based on the global motion.

Figure 4:
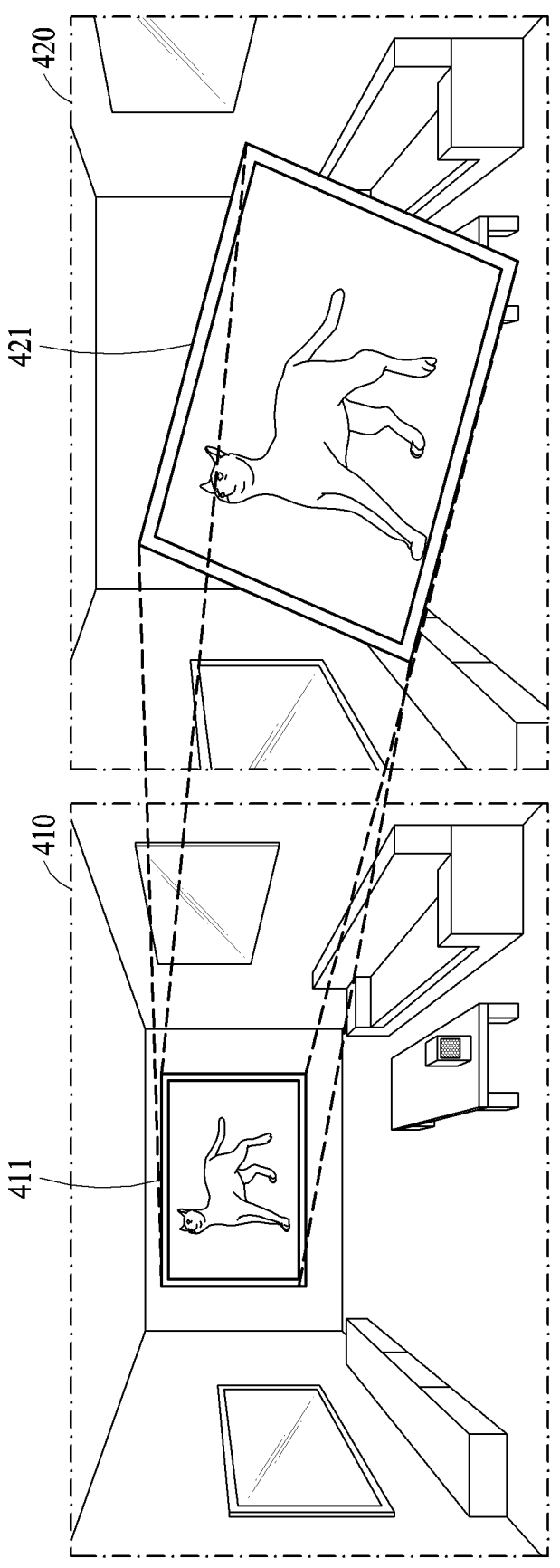
FIG. 4 illustrates an example estimation process of a transformation model through vision analysis according to one or more embodiments.

FIG. 4 illustrates an example estimation process of a transformation model through vision analysis. Referring to FIG. 4, a transformation model may be estimated through vision analysis, in which the transformation model may represent a transformation relationship between an object 411 of a first sample image frame 410 and an object 421 of a second sample image frame 420. When the transformation model is estimated through vision analysis, estimation of a matching point between the first sample image frame 410 and the second sample image frame 420, identification of an outlier based on local motion, and a random sample consensus (RANSAC) operation may be performed. For example, RANSAC may be an iterative method to estimate parameters of a mathematical model from a set of observed data that contains outliers, when outliers may be accorded no influence on the values of the estimates. When the matching point is not readily identified, or the local motion is active, a large throughput may be required to estimate the transformation model.

Figure 5:
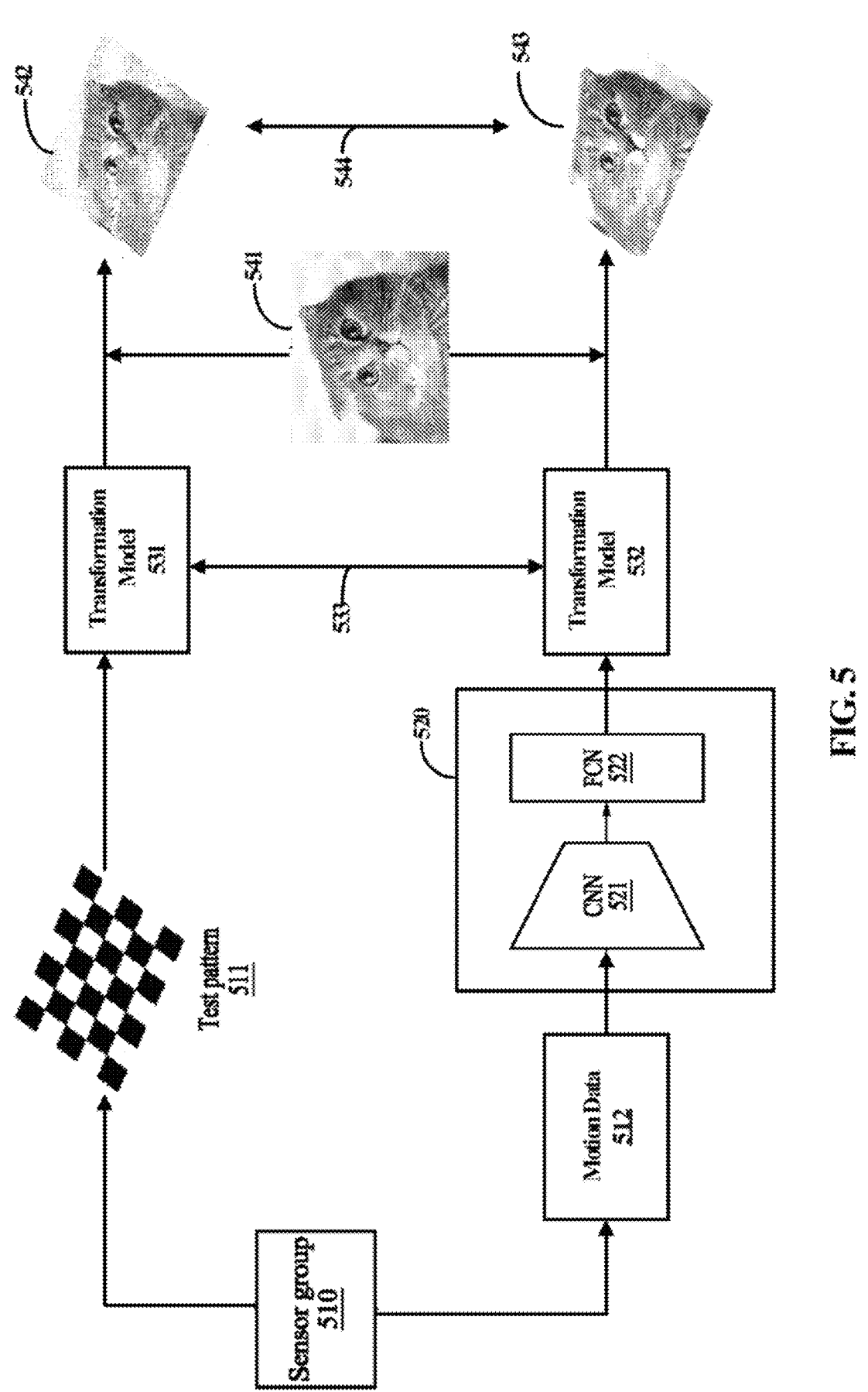
FIG. 5 illustrates an example training process of a neural network model according to one or more embodiments.

FIG. 5 illustrates an example training process of a neural network model according to one or more embodiments. In an example, the neural network model may be pretrained through the training process of FIG. 5. Referring to FIG. 5, image data may be generated by an image sensor (e.g., the image sensor described above with respect to FIG. 1) that is configured to capture a test pattern 511. The image sensor belongs to a sensor group 510 including a plurality of sensors that may be each configured to serve different sensing functions. The image data may be referred to as test image data. For example, the test pattern 511 may be a checkerboard. A transformation model 531 may be determined through vision analysis on the image data. The image data may include a plurality of image frames. The test pattern 511 may occupy a dominant portion of each image frame, and thus, local motion and an outlier may be minimized in the image frame. The test pattern 511 may be provided to a system. A matching point of the image frames may be readily extracted through the test pattern 511 provided to the system. The transformation model 531 representing global motion between the image frames of the image data may be derived through vision analysis. The transformation model 531 may be used as ground truth (GT) for training a neural network model 520.

While the image sensor captures the test pattern 511, motion data 512 may be generated by a motion sensor (e.g., the motion sensor described with respect to FIG. 1) that is configured to sense the motion of the image sensor. The motion sensor also belongs to the sensor group 510. The motion data 512 may be referred to as test motion data. The motion data 512 may be input to the neural network model 520. The neural network model 520 may include a CNN 521 and an FCN 522. However, the neural network model 520 of FIG. 5 may be a non-limiting example, and may have a structure different from that of FIG. 5. The neural network model 520 may estimate a transformation model 532 based on the motion data 512. The neural network model 520 may be trained based on loss data 533 between the transformation model 531 and the transformation model 532.

In an example, a first sensing period of the motion sensor may be less than a second sensing period of the image sensor. The motion data 512 may be generated by combining output data of the motion sensor that is collected during the second sensing period of the image sensor. For example, the motion data 512 may be generated by combining output data collected during r repetitions of the first sensing period of the motion sensor. For example, the motion sensor may output sensor data at 150 to 200 hertz (Hz) and the image sensor may output sensor data at 30 Hz. When the motion sensor outputs the sensor data at 150 Hz, then r=5.

In an example, the motion sensor may output, as the output data, an acceleration value and angular velocity value with respect to each of an x-axis, a y-axis, and a z-axis in each sensing period. For example, the motion sensor may be an IMU. In this case, the output data of the motion sensor in each sensing period may include 6 sensing values, and thus, the motion data 512 may have a dimension of r*6. For example, when the transformation model 531 between a first image frame at a first time and a second image frame at a second time is estimated as GT through vision analysis, the motion data 512 of the r*6 dimension that is sensed between the first time and the second time may be input to the neural network model 520, and the transformation model 532 may be estimated. The neural network model 520 may be trained based on loss data 533 between the transformation model 531 and the transformation model 532.

In an example, an additional test image 541 may be transformed to a result image 542 by using the transformation model 531, and noise may be added to the result image 542. The additional test image 541 may also be transformed to a result image 543 by using the transformation model 532. Loss data 544 between the result image 542 and the result image 543 may be additionally used to train the neural network model 520. In an example, the neural network model 520 may be trained based on the loss data 533 and the loss data 544. In an example, the neural network model 520 may be trained such that a weighted sum of the loss data 533 and the loss data 544 may be minimized. The loss data 544 may adjust the sensitivity of each transformation parameter of the transformation model 532, thereby increasing the estimation accuracy of the neural network model 520.

Figure 6:
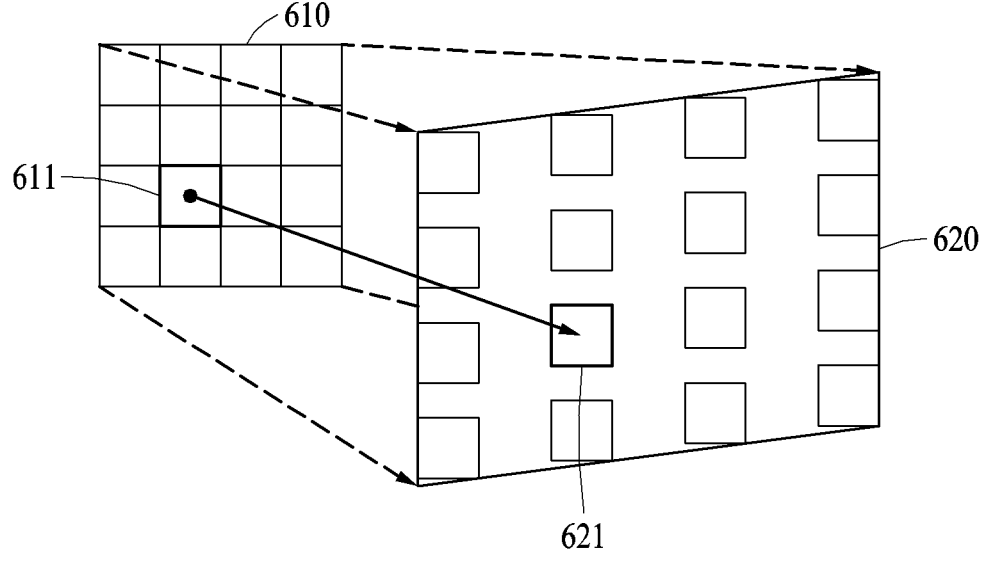
FIG. 6 illustrates an example translation of a search area by using a transformation model according to one or more embodiments.

FIG. 6 illustrates an example translation of a search area by using a transformation model according to one or more embodiments. In an example, video data corresponding to output image data may be encoded through a combination of first and second input image frames 610 and 620 of input image data. The video data may include matching data between pixel blocks of the first input image frame 610 and pixel blocks of the second input image frame 620. In an example, the pixel blocks of the first and second input image frames 610 and 620 may generate a prediction unit (PU) and a coding unit (CU).

The first input image frame 610 may be a current image frame and the second input image frame 620 may be a reference image frame. Motion data may be sensed based on motion of an image sensor (e.g., the image sensor described with respect to FIG. 1) between a first time and a second time, during which the image sensor captures the first input image frame 610 at the first time and the second input image frame 620 at the second time. A neural network model may estimate a transformation model based on the motion data. A current search area of a first current pixel block 611 of the first input image frame 610 may be transformed according to the transformation model. In an example, a position (e.g., a center position) of the first current pixel block 611 of the first input image frame 610 may be transformed, through the transformation model, to a matching position (e.g., a center position of a block 621) of the second input image frame 620. Based on the matching position of the second input image frame 620, a reference search area of the second input image frame 620 may be set for pixel matching of the first current pixel block 611.

In an example, information that may be processed through a bitstream may be preset when decoding a codec. In this case, the translation of the search area of FIG. 6 may be used for a video codec (e.g., high efficiency video coding (HEVC), advanced video coding (AVC), etc.) supporting 2D translation motion only. The translation may become a bias. When a limited search area is used, the search area may be effectively set by using camera motion through the implementations of FIG. 6. When rotation or other motion occurs, because search is performed in the translated search area, a residual may decrease while a compression rate may increase compared to a search area that is not translated. In an example, when the video codec supports a predicted motion vector (PMV), global motion according to the transformation model may be used as the PMV.

Figure 7:
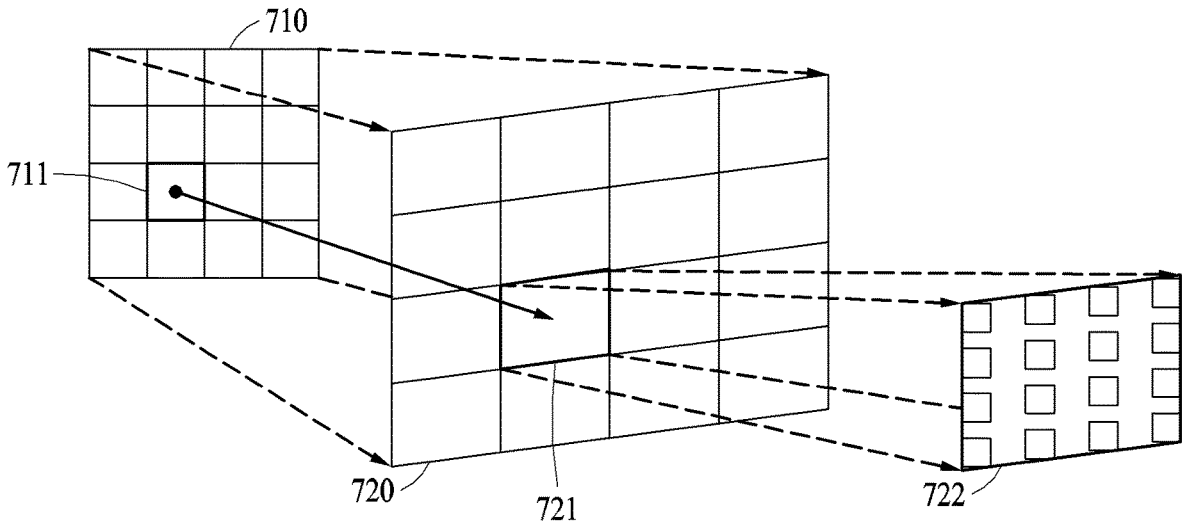
FIG. 7 illustrates an example transformation of a search area by using a transformation model according to one or more embodiments.

FIG. 7 illustrates an example transformation of a search area by using a transformation model according to one or more embodiments. In an example, video data corresponding to output image data may be encoded through a combination of first and second input image frames 710 and 720 of input image data. The video data may include matching data between pixel blocks of the first input image frame 710 and pixel blocks of the second input image frame 720. In an example, the pixel blocks of the first and second input image frames 710 and 720 may generate a PU and a CU.

The first input image frame 710 may be a current image frame and the second input image frame 720 may be a reference image frame. Motion data may be sensed based on motion of an image sensor (e.g., the image sensor described with respect to FIG. 1) between a first time and a second time, during which the image sensor captures the first input image frame 710 at the first time and the second input image frame 720 at the second time. A neural network model may estimate a transformation model based on the motion data. A current search area 711 of a first current pixel block of the first input image frame 710 may be transformed according to the transformation model. In an example, the current search area 711 of the first current pixel block of the first input image frame 710 may be transformed, through the transformation model, to reference search areas 721 and 722 of the second input image frame 720. Block matching may be performed through the reference search areas 721 and 722.

In an example, information that may be processed through a bitstream may be preset when decoding a codec. In this case, the transformation of the search area of FIG. 7 may be used for a video codec (e.g., versatile video coding (VVC), etc.) supporting 2D transformation (e.g., affine transformation). In this case, the video codec may use many resources during encoding to support the 2D transformation (e.g., the affine transformation) of the PU. In this case, a throughput may significantly decrease through the transformation model using the neural network model. In this case, the search areas 711 and 721 may be PUs. For example, unlike other methods of searching for motion in each PU unit, affine motion may be searched for by applying an affine bias to the PUs, and thus the accuracy of a motion vector compared to the search area may increase. Thereafter, motion compensation may be performed in a 4*4 sub-block unit of the PUs. Only affine information may be transmitted to a decoder.

Figure 8:
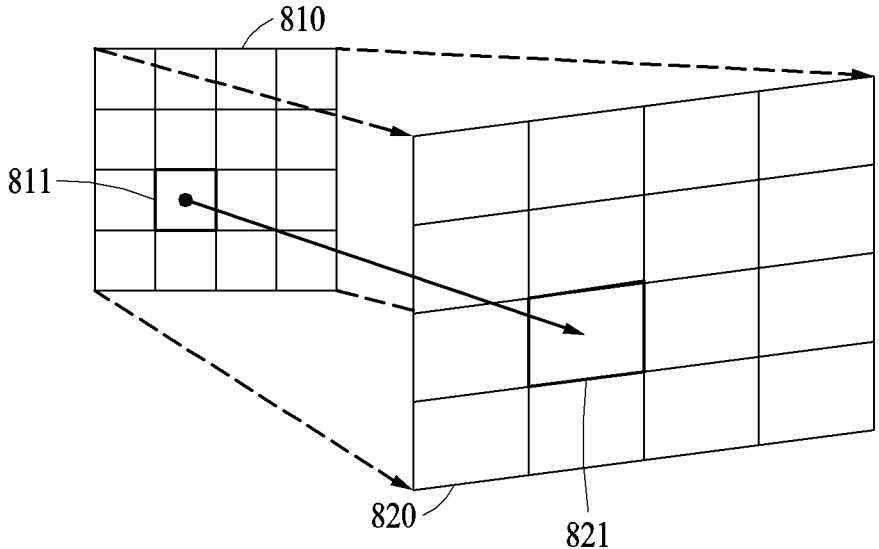
FIG. 8 illustrates an example image processing using a transformation model according to one or more embodiments.

FIG. 8 illustrates an example image processing using a transformation model according to one or more embodiments. In an example, the transformation model may be used for ISP. In an example, global motion between image frames 810 and 820 may be compensated by using the transformation model, and photo data corresponding to output image data may be generated. Because ISP does not have a set standard as a codec, the transformation model may be freely used.

In an example, the transformation model may be configured to perform noise reduction. Also, the transformation model may be configured to transform a current search area 811 to a reference search area 821, and perform block matching by using the reference search area 821. Like 3D noise reduction, similar patches may be overlapped with one another through block matching, and random noise may decrease. In an example, the transformation model may be used for multi-exposure high dynamic range (HDR) technology. In a multi-exposure HDR, brightness adaptive fusion may be performed on two image frames of which exposures are different from each other, and the transformation model may be used to estimate camera motion between the two image frames having a capturing time difference.

In an example, the transformation model may be used to estimate camera motion during an exposure time upon camera motion deblurring. The transformation model may be configured to locally and accurately estimate a deblur kernel. In an example, in frame rate up conversion (FRUC), the transformation model may increase motion estimation accuracy between image frames.

Figure 9:
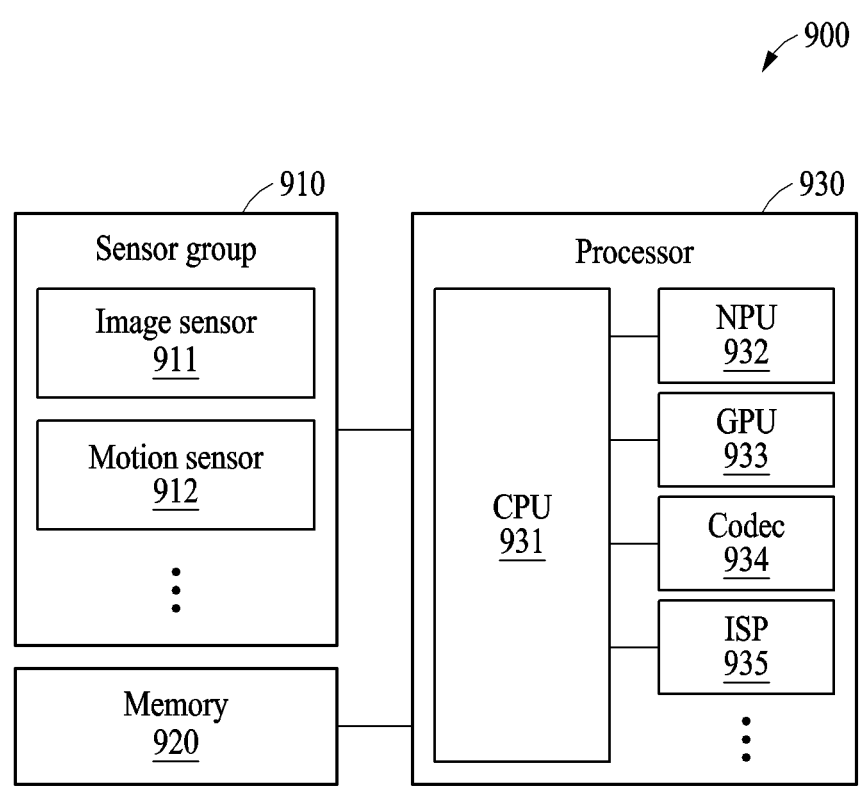
FIG. 9 illustrates an example electronic device with image processing according to one or more embodiments.

FIG. 9 illustrates an example electronic device with image processing according to one or more embodiments. Referring to FIG. 9, an electronic device 900 may include a sensor group 910, a memory 920, and a processor 930. For example, the electronic device 900 may be a mobile device, such as a mobile phone, a smartphone, a personal digital assistant (PDA), a netbook, a tablet computer, a laptop computer, and the like, a wearable device, such as a smart-watch, a smart band, smart glasses, and the like, a home appliance, such as a television (TV), a smart TV, a refrigerator, and the like, a security device, such as a door lock and the like, and a vehicle such as an autonomous vehicle, a smart vehicle, and the like.

The memory 920 may be connected to the processor 930 via an internal bus, and may store instructions executable by the processor 930. The memory 920 may also store data to be computed by the processor 930, data processed by the processor 930, and/or various models, such as the transformation model. The memory 920 may include a non-transitory computer-readable medium, for example, a high-speed random-access memory (RAM), and/or a non-volatile computer-readable storage medium, for example, at least one disk storage device, a flash memory device, and other non-volatile solid-state memory devices.

The sensor group 910 may include an image sensor 911 and a motion sensor 912. The image sensor 911 may generate input image data including a first image frame at a first time and a second image frame at a second time. The motion sensor 912 may generate motion data representing the motion of the image sensor between the first time and the second time. The image sensor 911 and the motion sensor 912 may be the image sensor and the motion sensor described above with respect to FIG. 1 as a non-limiting example.

The processor 930 may execute the instructions to configure the processor 930 to perform any or any combination of the operations described with reference to FIGS. 1 through 8 and 10. For example, the processor 930 may be configured to estimate a transformation model corresponding to global motion between the first image frame and the second image frame by executing a neural network model by using the motion data and to generate output image data by combining the first image frame and the second image frame by using the transformation model, as well as any or any combination of the operations.

The processor 930 may include a central processing unit (CPU) 931, a neural processing unit (NPU) 932, a graphics processing unit (GPU) 933, a codec 934, and an image signal processor (ISP) 935. The CPU 931 may execute instructions stored in memory 920 to configure the CPU 931 to perform any or any combination of the operations described with reference to FIGS. 1 through 8 and 10. The NPU 932 and/or the GPU 933 may execute instructions stored in memory to configure the NPU 932 and/or the GPU 933 to process computations for executing the neural network model in any or any combination of the operations described with reference to FIGS. 1 through 8 and 10.

The codec 934 may be a video codec. The codec 934 is representative of including a processor that, based on instructions stored in memory 920 executed by the processor configures the processor to perform operations for video encoding and video decoding in the operations described with reference to FIGS. 1 through 8 and 10. For example, the codec 934, to set the search area, may transform a first position of the first pixel block of the first image frame to a second position of the second image frame by using the transformation model and set the search area of the second image frame according to the second position. The codec 934, to set the search area, may transform a search area of the first image frame according to the first pixel block of the first image frame to the search area of the second image frame by using the transformation model. The ISP 935, to generate output image data, may execute instructions stored in memory 920 to configure the ISP 935 to generate photo data corresponding to the output image data by compensating the global motion between the first image frame and the second image frame by using the transformation model.

Figure 10:
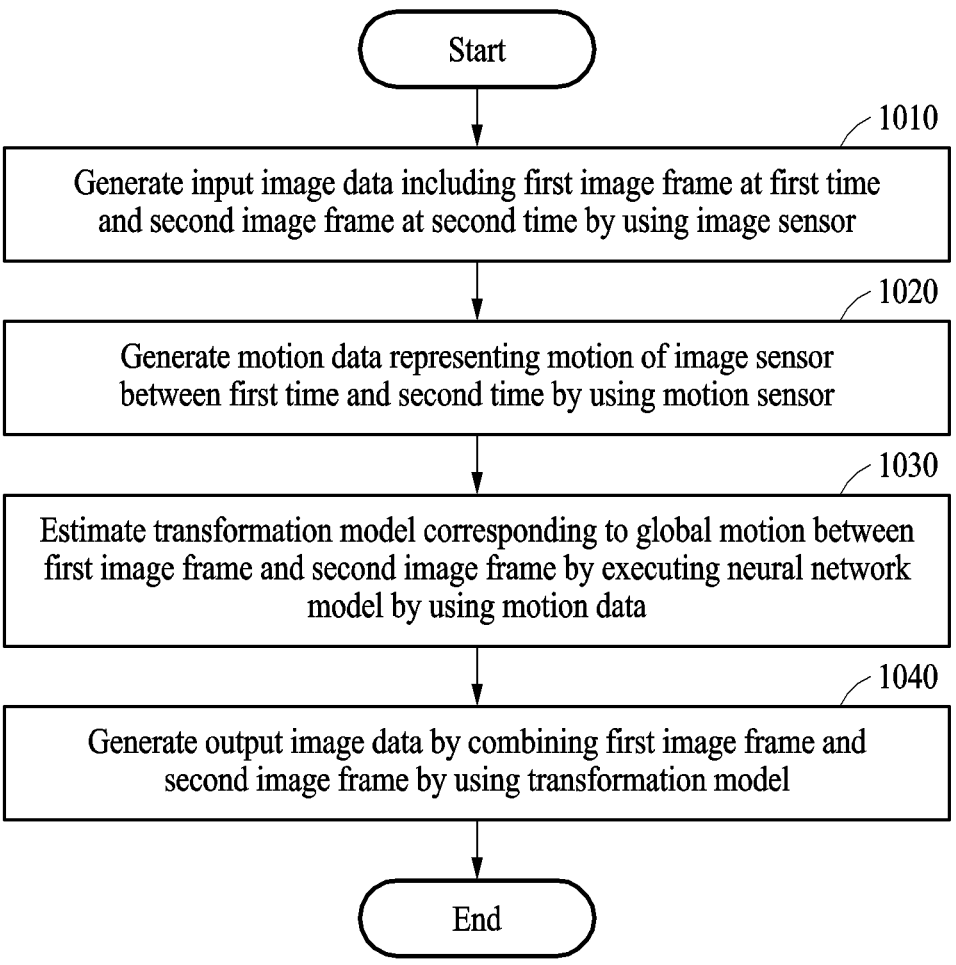
FIG. 10 illustrates an example method with image processing using a transformation model according to one or more embodiments.

FIG. 10 illustrates an example method with image processing according to one or more embodiments. Referring to FIG. 10, an electronic device (e.g., the electronic device 900 in FIG. 9) may generate, in operation 1010, input image data including a first image frame at a first time and a second image frame at a second time. The first and second image frames may be captured by an image sensor (e.g., one of the image sensors described above). In operation 1020, the electronic device may generate motion data representing the motion of the image sensor between the first time and the second time. The motion may be captured by a motion sensor (e.g., one of motion sensors described above). I In operation 1030, the electronic device may estimate a transformation model for performing transformation, based on global motion between the first image frame and the second image frame, by executing a neural network model by using the motion data. In operation 1040, the electronic device may generate output image data by combining the first image frame and the second image frame by using the transformation model.

Operation 1040 may include the encoding of the first image frame and the second image frame into video data corresponding to the output image data by using the transformation model. The video data may include matching data between pixel blocks of the first image frame and pixel blocks of the second image frame, and the encoding may include setting a search area of the second image frame for block matching of a first pixel block of the first image frame by using the transformation model and searching for a second pixel block matching with the first pixel block of the first image frame in the search area of the second image frame. The setting of the search area may include the transforming of a first position of the first pixel block of the first image frame to a second position of the second image frame by using the transformation model and setting of the search area of the second image frame according to the second position. The setting of the search area may include the transforming of a search area of the first image frame according to the first pixel block of the first image frame to the search area of the second image frame by using the transformation model.

Operation 1040 may include the generating of photo data corresponding to the output image data by compensating the global motion between the first image frame and the second image frame by using the transformation model.

The motion data may include at least some of acceleration data and angular velocity data according to the motion of the image sensor between the first time and the second time. A first sensing period of the motion sensor may be less than a second sensing period of the image sensor, and motion data generated by combining output data of the motion sensor that is collected during the second sensing period may be input to the neural network model.

The neural network model may be pretrained by using training data based on a sensing result obtained by sensing the motion of the image sensor through the motion sensor while the image sensor captures a provided test pattern and based on a capturing result obtained by capturing the provided test pattern through the image sensor.

The neural network model may be pretrained by determining a first test transformation model by performing vision analysis on test image data obtained by capturing the provided test pattern through the image sensor, estimating a second test transformation model by inputting, to the neural network model, test motion data obtained by sensing the motion of the image sensor through the motion sensor while the image sensor captures the provided test pattern, determining first loss data corresponding to a difference between the first test transformation model and the second test transformation model, and training the neural network model based on the first loss data.

The neural network model may be pretrained by generating a first result image by transforming an additional test image by using the first test transformation model, generating a second result image by transforming the additional test image by using the second test transformation model, determining second loss data corresponding to a difference between the first result image and the second result image, and training the neural network model based on the first loss data and the second loss data.

In addition, the descriptions provided with reference to FIGS. 1 through 9 may be applied to the image processing method of FIG. 10.

The processors, memories, electronic devices, apparatuses, neural network model 130, 520, transformation models 140, 531, 532, image processing 150, sensor groups 510, 910, processor 930 and other apparatuses, devices, units, modules, and components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A processor-implemented method comprising:
estimating a transformation model using a transformation determination neural network model, provided motion sensor detected motion data representing motion of an image sensor with respect to a first image frame at a first time and a second image frame at a second time different from the first time captured by the image sensor, to perform a transformation based on global motion between the first image frame and the second image frame; and
generating output image data by combining, by using the transformation model, the first image frame and the second image frame,
wherein a first sensing period of the motion sensor is less than a second sensing period of the image sensor, and
wherein motion data generated from output data of the motion sensor that is collected during the second sensing period is input to the transformation determination neural network model.

2. The method of claim 1, further comprising:
generating input image data comprising the first image frame and the second image frame using the image sensor; and
generating the motion data using the motion sensor, and;
wherein generating of the output image data comprises by encoding the first image frame and the second image frame into video data corresponding to the output image data using the transformation model.

3. The method of claim 2,
wherein the video data comprises matching data between pixel blocks of the first image frame and pixel blocks of the second image frame, and
wherein the encoding comprises:
setting a search area of the second image frame for block matching of a first pixel block of the first image frame by using the transformation model; and
searching for a second pixel block matching with the first pixel block in the search area of the second image frame.

4. The method of claim 3, wherein the setting of the search area comprises transforming a first position of the first pixel block of the first image frame to a second position of the second image frame by using the transformation model; and setting the search area of the second image frame according to the second position.

5. The method of claim 3, wherein the setting of the search area comprises transforming a search area of the first image frame according to the first pixel block of the first image frame to the search area of the second image frame by using the transformation model.

6. The method of claim 1, wherein the generating of the output image data comprises generating photo data corresponding to the output image data by compensating the global motion between the first image frame and the second image frame by using the transformation model.

7. The method of claim 1, wherein the motion data comprises at least some of acceleration data and angular velocity data according to the motion of the image sensor between a first time point and a second time point.

8. The method of claim 1, further comprising generating the transformation determination neural network model by training on in-training transformation determination neural network model using training data based on a sensing result obtained by sensing a corresponding motion of the image sensor by the motion sensor with respect to a training image captured by the image sensor of a test pattern.

9. The method of claim 1, further comprising generating the transformation determination neural network model by:
determining a first test transformation model by performing vision analysis on test image data obtained by capturing a provided test pattern through the image sensor;
estimating a second test transformation model by inputting, to the transformation determination neural network model, test motion data obtained by sensing the motion of the image sensor through the motion sensor while the image sensor captures the provided test pattern;
determining first loss data corresponding to a difference between the first test transformation model and the second test transformation model; and
generating the transformation determination neural network model based on the first loss data.

10. The method of claim 9, wherein generating the transformation determination neural network model further comprises:
generating a first result image by transforming an additional test image by using the first test transformation model;
generating a second result image by transforming the additional test image by using the second test transformation model;
determining second loss data corresponding to a difference between the first result image and the second result image; and
generating the transformation determination neural network model by training an in-training transformation determination neural network model based on the first loss data and the second loss data.

11. A non-transitory computer-readable storage medium storing instructions that, when executed by a processor, cause the processor to perform the method of claim 1.

12. An electronic device comprising:
one or more processors configured to:
estimate a transformation model using a transformation determination neural network model, provided motion sensor detected motion data representing motion of an image sensor with respect to a first image frame at a first time and a second image frame at a second time different from the first time captured by the image sensor, to perform a transformation based on global motion between the first image frame and the second image frame; and generate output image data by combining, by using the transformation model, the first image frame and the second image frame, wherein a first sensing period of the motion sensor is less than a second sensing period of the image sensor, and wherein motion data generated from output data of the motion sensor that is collected during the second sensing period is input to the transformation determination neural network model.

13. The electronic device of claim 12, further comprising:

the image sensor configured to generate input image data comprising the first image frame and the second image frame; and the motion sensor configured to generate the motion data; and wherein the one or more processors comprise a codec configured to encode the first image frame and the second image frame into video data corresponding to the output image data using the transformation model.

14. The electronic device of claim 13, wherein the video data comprises matching data between pixel blocks of the first image frame and pixel blocks of the second image frame, and wherein the codec is configured to:

set a search area of the second image frame for block matching of a first pixel block of the first image frame by using the transformation model and search for a second pixel block matching with the first pixel block of the first image frame in the search area of the second image frame.

15. The electronic device of claim 14, wherein the codec, to set the search area, is configured to transform a first position of the first pixel block of the first image frame to a second position of the second image frame by using the transformation model and set the search area of the second image frame according to the second position.

16. The electronic device of claim 14, wherein the codec, to set the search area, is configured to transform a search area of the first image frame according to the first pixel block of the first image frame to the search area of the second image frame by using the transformation model.

17. The electronic device of claim 12, wherein the one or more processors, to generate the output image data, are configured to generate photo data corresponding to the output image data by compensating the global motion between the first image frame and the second image frame by using the transformation model.

18. The electronic device of claim 12, wherein the transformation determination neural network model is generated using training data based on a sensing result obtained by sensing a corresponding motion of the image sensor by the motion sensor with respect to a training image captured by the image sensor of a test pattern.

* * * * *